W. W. FULLER.
CAR CONSTRUCTION.
APPLICATION FILED NOV. 19, 1915.

1,192,881.

Patented Aug. 1, 1916.
3 SHEETS—SHEET 1.

Witnesses
J. H. Crawford
J. J. McCarty

Inventor
W. W. Fuller,
By Victor J. Evans
Attorney

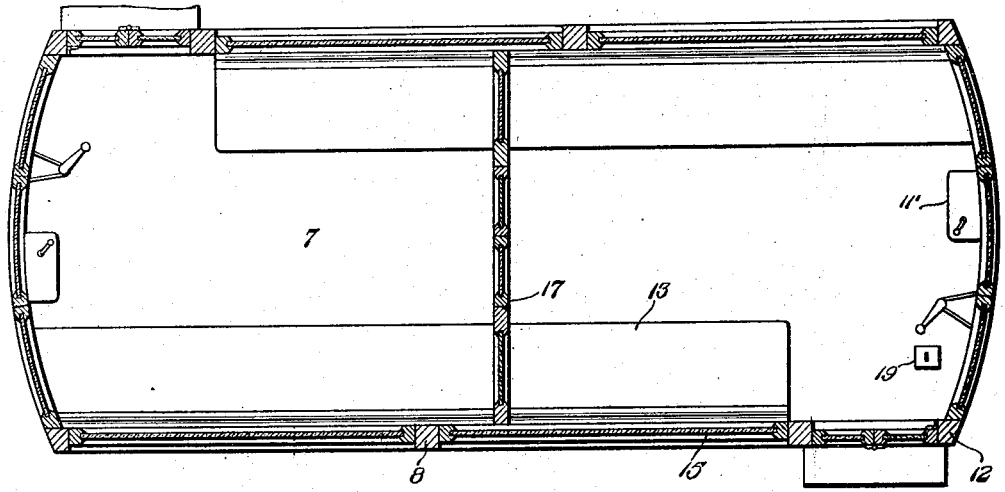
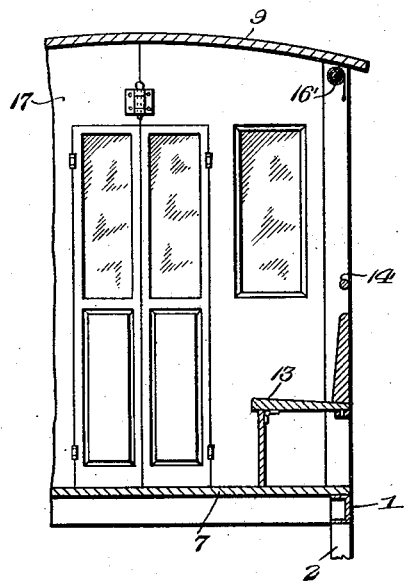
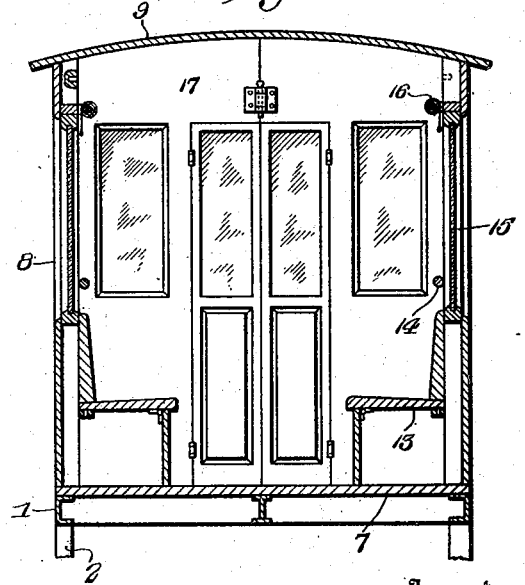

W. W. FULLER.
CAR CONSTRUCTION.
APPLICATION FILED NOV. 19, 1915.

1,192,881. Patented Aug. 1, 1916.
3 SHEETS—SHEET 3.

UNITED STATES PATENT OFFICE.

WALLACE W. FULLER, OF CHARLESTON, SOUTH CAROLINA.

CAR CONSTRUCTION.

1,192,881. Specification of Letters Patent. Patented Aug. 1, 1916.

Application filed November 19, 1915. Serial No. 62,358.

*To all whom it may concern:*

Be it known that I, WALLACE W. FULLER, a citizen of the United States, residing at Charleston, in the county of Charleston and State of South Carolina, have invented new and useful Improvements in Car Constructions, of which the following is a specification.

This invention relates to improvements in car construction and has particular application to a car adapted to be propelled by motive power upon a trackway.

In carrying out the present invention, it is my purpose to provide a car of the class described which will be light in weight, strong and durable in construction, which may be readily converted from an open car into a closed car, wherein the use of platforms will be eliminated, and which may be operated and maintained at small cost.

It is also my purpose to provide a car of the class described which may be operated over the usual urban and interurban railway tracks with a minimum current consumption and which may be divided off into sections whenever desired or necessary.

With the above and other objects in view, the invention consists in the construction, combination and arrangement of parts hereinafter set forth in and falling within the scope of the claims.

Figure 1:
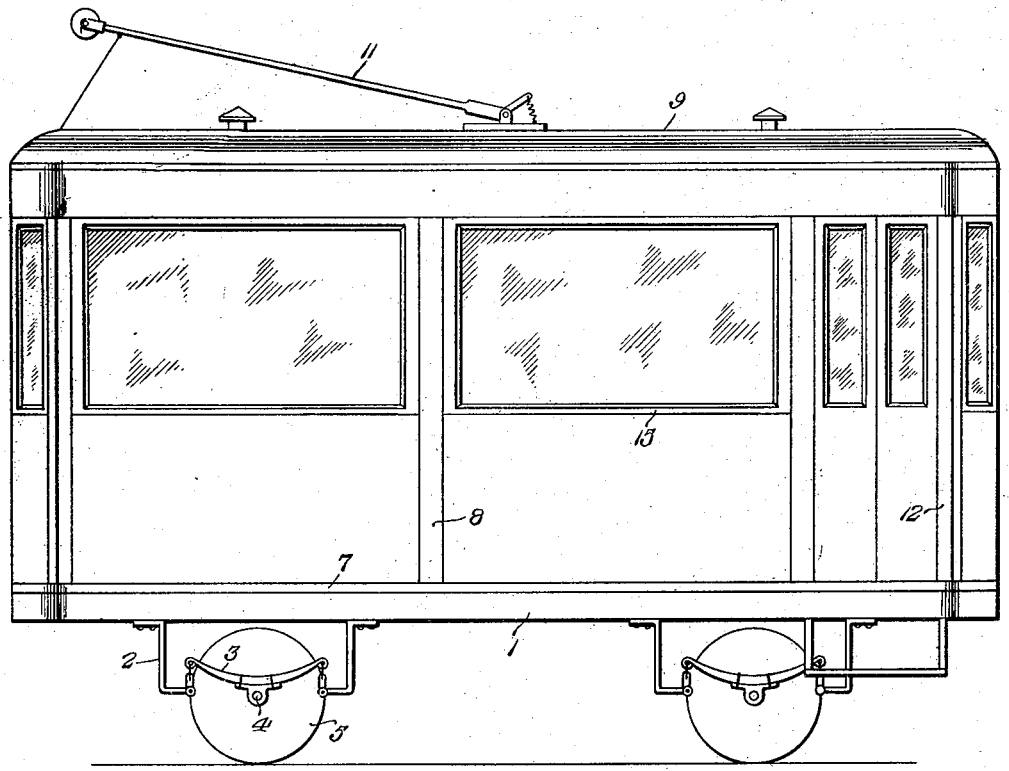
Figure 5:
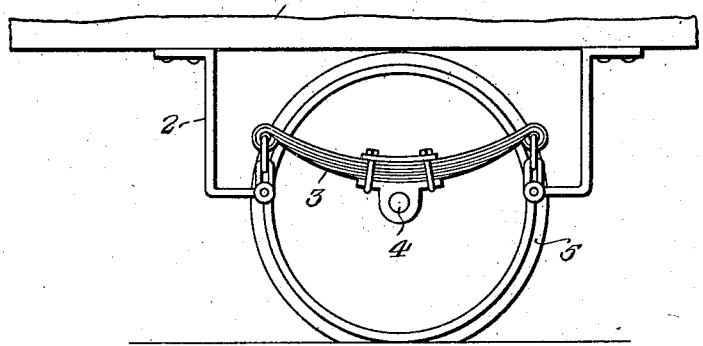
Figure 4:
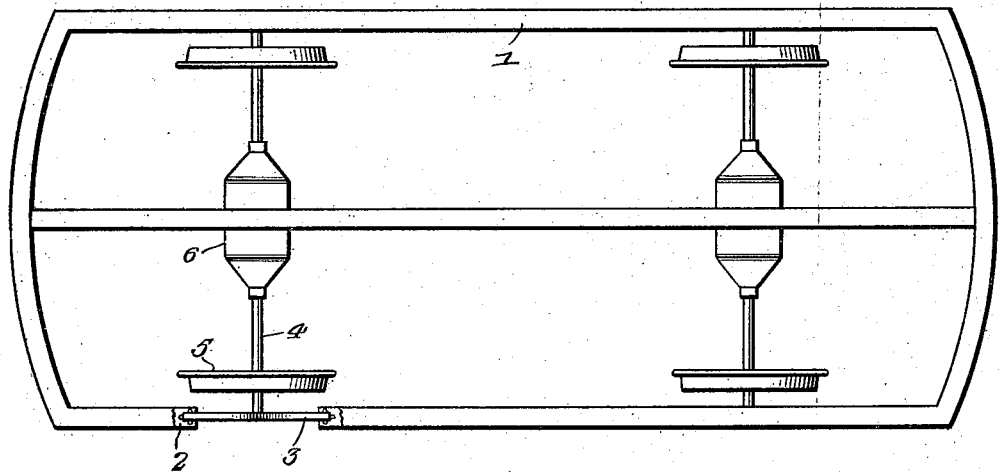
Figure 6:
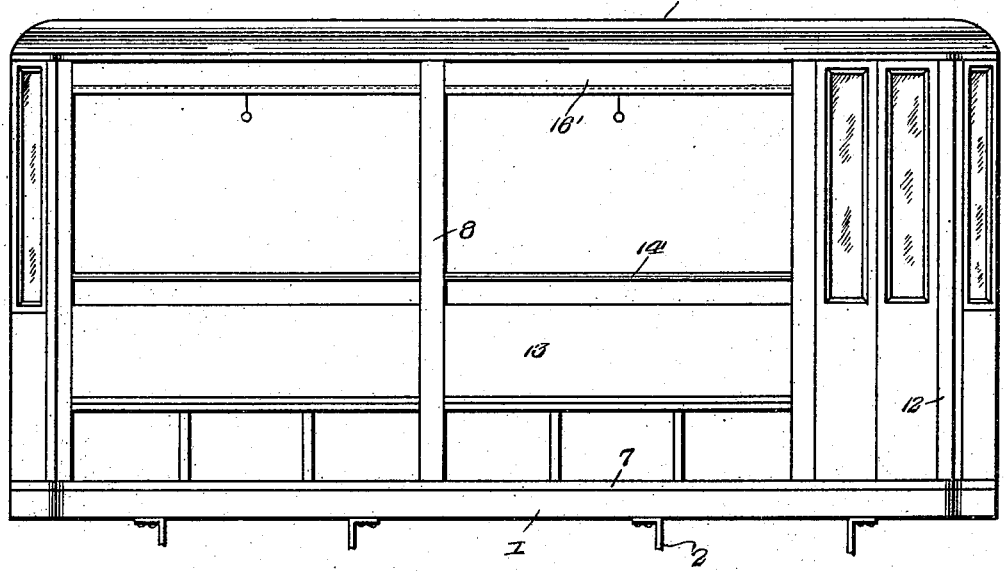

In the accompanying drawings: Figure 1 is a view in side elevation of a car constructed in accordance with my present invention. Fig. 2 is a longitudinal sectional view through the same. Fig. 3 is a cross sectional view therethrough. Fig. 4 is a bottom plan view of the car. Fig. 5 is a fragmentary side elevation thereof. Fig. 6 is a view in side elevation showing a modified construction. Fig. 7 is a fragmentary cross sectional view through the structure illustrated in Fig. 6.

Referring now to the drawings in detail, 1 designates a substantially rectangular frame embodying side and end bars and secured to each side bar of the frame 1 adjacent to the respective ends thereof and depending therefrom are pairs of hangers 2, the hangers of each pair being spaced apart longitudinally of the bar. Connected to the lower ends of the hangers of each pair in some suitable manner and spanning the space between such hangers is a leaf spring 3 and connected to the leaf springs at each end of the frame and extending across the frame are axles 4 upon which are mounted wheels 5 and motors 6 adapted to revolve the axles to rotate the wheels. In the present instance, the wheels 5 are flanged to traverse the rails of any ordinary urban or interurban railway. Mounted upon the frame 1 and appropriately fastened thereto is a floor 7 constituting the bottom of the car. Secured to the side bars of the frame 1 and projecting upwardly therefrom are standards 8 and the standards on each side bar are spaced apart so as to provide a central standard and end standards and at one end of each bar the standards are arranged close together so as to provide an entrance passage and the corresponding standards on the other bar are arranged at the opposite end thereof so as to provide an exit opening. Mounted on the upper ends of these standards and suitably connected thereto is a roof 9 provided with ventilators and carrying a trolley pole 11 equipped with a trolley wheel adapted to engage a trolley wire and this pole is connected up with the motors 6, and located in the connection between the trolley and the motors are controllers 11' arranged adjacent to the ends of the car respectively. Uprising from the end bars of the frame 1 are standards 12 having the upper ends thereof connected to the respective ends of the roof and coöperating with the standards 8 to support the roof. Arranged around the interior of the car and secured to the floor are seats 13 arranged along the sides and ends of the car. Also arranged around the sides and ends of the car above the backs of the seats is a rail 14, while arranged between adjacent standards are transparent windows 15 capable of downward sliding movement behind the seats and adapted to be used during inclement weather. When the windows are removed curtains 16 may be substituted therefor.

17 designates a partition adapted to be arranged transversely of the car to divide the same into compartments and the opposite edges of this partition are adapted to be engaged with opposite standards on the respective side bars of the frame and to be fastened to such standards so that the partition may be held in proper position within the body of the car.

At the entrance and exit openings, the seats are removable and under the control of the motorman and the car may be equipped with steps at the entrance and exit openings which are movable to active and inactive positions.

Arranged adjacent to each controller is a brake rod under the control of the motorman and connected with suitable brake mechanism associated with the wheels. A fare box 19 is preferably detachably associated with one of the standards at the entrance opening and is adapted to receive the fares as the passengers enter the car and may be carried to the other end of the car by the motorman when the direction of movement of the car is to be reversed and when the direction of travel of the car is reversed the previous exit opening forms the entrance opening to the car, while the previous entrance opening constitutes the exit.

In the modified form of my invention illustrated in Figs. 6 and 7 of the drawings, I have shown the car constructed without the transparent windows 15 and in place of these windows I employ curtains 16'.

It will be seen that I have provided a car which is very light in construction, which may be operated with a minimum consumption of current, which may be manufactured at small cost, and which may be operated on any urban or interurban railway track with comparatively small wear on the track rails and roadbed.

In practice, the car may be propelled by any suitable motive power such, for instance, as gasolene, etc., and the electric motors and trolley may be eliminated.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In car construction, a frame, hangers depending from the side bars of said frame adjacent to the ends thereof, springs carried by said hangers, axles carried by said springs and extending across the frame, wheels on said axles, motors for rotating said axles, a floor on said frame, standards uprising from the respective side and end bars of said frame, the standards on each side bar being so arranged as to provide a central standard and end standards, the standards at the relatively opposite ends of the side bars being arranged close together to form entrance and exit openings, a roof on the upper ends of said standards, and a partition detachably connected with opposite standards and arranged across the car body to divide the same into compartments.

2. In car construction, a frame, hangers depending from the side bars of said frame adjacent to the ends thereof, springs carried by said hangers, axles carried by said springs and extending across the frame, wheels on said axles, motors for rotating said axles, a floor on said frame, standards uprising from the respective side and end bars of said frame, the standards on each side bar being so arranged as to provide a central standard and end standards, the standards at the relatively opposite ends of the side bars being arranged close together to form entrance and exit openings, a roof on the upper ends of said standards, seats arranged along the sides and ends of the car, and a rail above said seats.

In testimony whereof I affix my signature in presence of two witnesses.

WALLACE W. FULLER.

Witnesses:
H. A. SMITH, Jr.,
W. P. HAWES.